United States Patent
Bostick et al.

(10) Patent No.: US 10,432,868 B2
(45) Date of Patent: Oct. 1, 2019

(54) REMOVING AERIAL CAMERA DRONES FROM A PRIMARY CAMERA'S FIELD OF VIEW

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 14/837,746

(22) Filed: Aug. 27, 2015

(65) Prior Publication Data
US 2017/0064259 A1 Mar. 2, 2017

(51) Int. Cl.
*H04N 5/232* (2006.01)
*G06K 9/00* (2006.01)
*G06K 9/34* (2006.01)

(52) U.S. Cl.
CPC ....... *H04N 5/23296* (2013.01); *G06K 9/0063* (2013.01); *G06K 9/346* (2013.01)

(58) Field of Classification Search
CPC ... G06K 9/0063; G01S 3/782; H04N 5/23296
See application file for complete search history.

(56) References Cited

U.S. PATENT DOCUMENTS

| | | | |
|---|---|---|---|
| 8,340,358 B2 | 12/2012 | Cincotti et al. | |
| 8,693,727 B2 | 4/2014 | Pan et al. | |
| 8,767,062 B2 | 7/2014 | Omi et al. | |
| 2009/0252913 A1 | 10/2009 | Cincotti et al. | |
| 2013/0307994 A1 | 11/2013 | Takeuchi et al. | |
| 2014/0184858 A1* | 7/2014 | Yu | H04N 5/23293 348/241 |
| 2014/0251123 A1* | 9/2014 | Venema | F41G 3/16 89/41.22 |
| 2015/0022698 A1 | 1/2015 | Na et al. | |
| 2015/0067560 A1 | 3/2015 | Cieplinski et al. | |

(Continued)

FOREIGN PATENT DOCUMENTS

WO 2009054872 A2 4/2009

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Rowina J Cattungal
(74) *Attorney, Agent, or Firm* — Law Office of Jim Boice

(57) ABSTRACT

A camera has a sensor, a signal generator, and a transmitter. The sensor detects a mobile airborne device within a field of view of a primary camera, where a three-dimensional physical space is within the field of view of the primary camera. The signal generator generates a signal that, when received by the mobile airborne device, causes the mobile airborne device to exit the three-dimensional physical space. The transmitter transmits the signal to the mobile airborne device to cause the mobile airborne device to exit the three-dimensional physical space that is within the field of view of the primary camera.

19 Claims, 7 Drawing Sheets

(56) References Cited

U.S. PATENT DOCUMENTS

| | | |
|---|---|---|
| 2015/0067894 A1 | 3/2015 | Aghara |
| 2016/0122038 A1* | 5/2016 | Fleischman .............. G06T 7/73 701/2 |
| 2016/0180719 A1* | 6/2016 | Wouhaybi ............ G08G 5/0082 701/4 |
| 2016/0253907 A1* | 9/2016 | Taveira ................. G08G 5/006 701/3 |
| 2017/0192089 A1* | 7/2017 | Parker .................... G01S 3/782 |

OTHER PUBLICATIONS

C. Gushiken et al., "Adobe Launches Photoshop CS5 and Photoshop CS5 Extended", Adobe Systems Incorporated, Apr. 12, 2010, pp. 1-2.

Anonymous, "Method for Optimum Viewpoint for Drone Photography Based on User Commands", IP.com, IPCOM000239970D, Dec. 2014, pp. 1-4.

Anonymous, "Photoshop CS5 New Features—Content Aware Fill Tutorial", www.photoshopessentials.com, 2015, pp. 1-13.

\* cited by examiner

REMOVING AERIAL CAMERA DRONES FROM A PRIMARY CAMERA'S FIELD OF VIEW

BACKGROUND

The present disclosure relates to the field of capturing photographic and video images, and specifically to the use of cameras that capture photographic and video images. Still more specifically, the present disclosure relates to the field of removing flying camera drones from a field of view of a primary camera.

Unmanned aerial vehicles (UAV), commonly referred to as drones or "camera drones" or "aerial camera drones", are increasingly being used for photographic purposes. A drone offers a unique photographic perspective by utilizing altitude and angle that are not possible from a photograph/video taken with a traditional camera on the ground. Frequently, a photographer/videographer may choose to employ both a traditional land-based camera with one or more drones to capture multiple perspectives of a given view.

The use of one or more drones and regular cameras taking photographs during a photo shoot presents opportunities for one of the drones to create obstacles in the photograph, either from the land-based cameras or from cameras of other drones.

For example, consider a movie that is being shot with a combination of terrestrial cameras (either fixed on a tripod or movable along a track) and aerial camera drones. One of the terrestrial cameras may be designated as the primary camera for capturing the main shot, while the aerial camera drones may be filming ancillary shots, often known as "B-roll", for the scene. The presence of a drone in the main shot ruins the authenticity of the main shot, particularly if the movie is a period piece (e.g., a "Western" from the 1800's).

SUMMARY

In an embodiment of the present invention, a camera includes a sensor, a signal generator, and a transmitter. The sensor detects a mobile airborne device within a field of view of a primary camera, where a three-dimensional physical space is within the field of view of the primary camera. The signal generator generates a signal that, when received by the mobile airborne device, causes the mobile airborne device to exit the three-dimensional physical space. The transmitter transmits the signal to the mobile airborne device to cause the mobile airborne device to exit the three-dimensional physical space that is within the field of view of the primary camera. This provides a new and useful improvement over the prior art by automatically removing undesired mobile airborne devices (such as flying camera drones) out of the field of view of the camera.

In an embodiment of the present invention, the signal is a packet of instructions directing the mobile airborne device to exit the three-dimensional physical space that is within the field of view of the primary camera. This provides the benefit of the camera being able to directly control the movement of the mobile airborne device.

In an embodiment of the present invention, the signal is a data-less signal, where the mobile airborne device exits the three-dimensional physical space in response to detecting the data-less signal. This provides the benefit of the mobile airborne device autonomously removing itself from the field of view of the camera.

In an embodiment of the present invention, a mobile airborne device (e.g., an aerial camera drone) has a propulsion device, a navigation device, and a signal receiver. The propulsion device (e.g., a motor and propeller) flies the mobile airborne device. The navigation device identifies and controls a current physical location of the mobile airborne device within a three-dimensional physical space. The signal receiver receives a signal from a primary camera, where the signal from the primary camera is generated by the primary camera in response to the primary camera detecting the mobile airborne device within the three-dimensional physical space that is within a field of view of the primary camera. The signal causes the navigation device to direct the propulsion device to fly the mobile airborne device out of the three-dimensional physical space that is within the field of view of the primary camera. This provides a new and useful improvement over the prior art by automatically removing undesired mobile airborne devices (such as flying camera drones) out of the field of view of the camera.

In an embodiment of the present invention, a method removes a mobile airborne device from a field of view of a primary camera. A sensor associated with a primary camera detects a mobile airborne device within a field of view of the primary camera, where a three-dimensional physical space is within the field of view of the primary camera. A signal generator generates a signal that, when received by the mobile airborne device, causes the mobile airborne device to exit the three-dimensional physical space. A transmitter transmits the signal to the mobile airborne device to cause the mobile airborne device to exit the three-dimensional physical space that is within the field of view of the primary camera.

In an embodiment of the present invention, one or more processors detect, based on signals from an orientation sensor within the primary camera, that the field of view of the primary camera has changed to a new field of view due to movement of the primary camera, such that a new three-dimensional physical space is now within the new field of view. In response to detecting that the field of view of the primary camera has changed, the signal generator generates a new signal that, when received by the mobile airborne device, causes the mobile airborne device to exit the new three-dimensional physical space. The transmitter then transmits the new signal to the mobile airborne device to cause the mobile airborne device to exit the new three-dimensional physical space that is within the new field of view of the primary camera. This provides a new and useful improvement over the prior art in which one or more video drones are dynamically controlled according to how the position of a primary camera changes, thus enabling a better shot for the primary camera.

DETAILED DESCRIPTION

Figure 1:
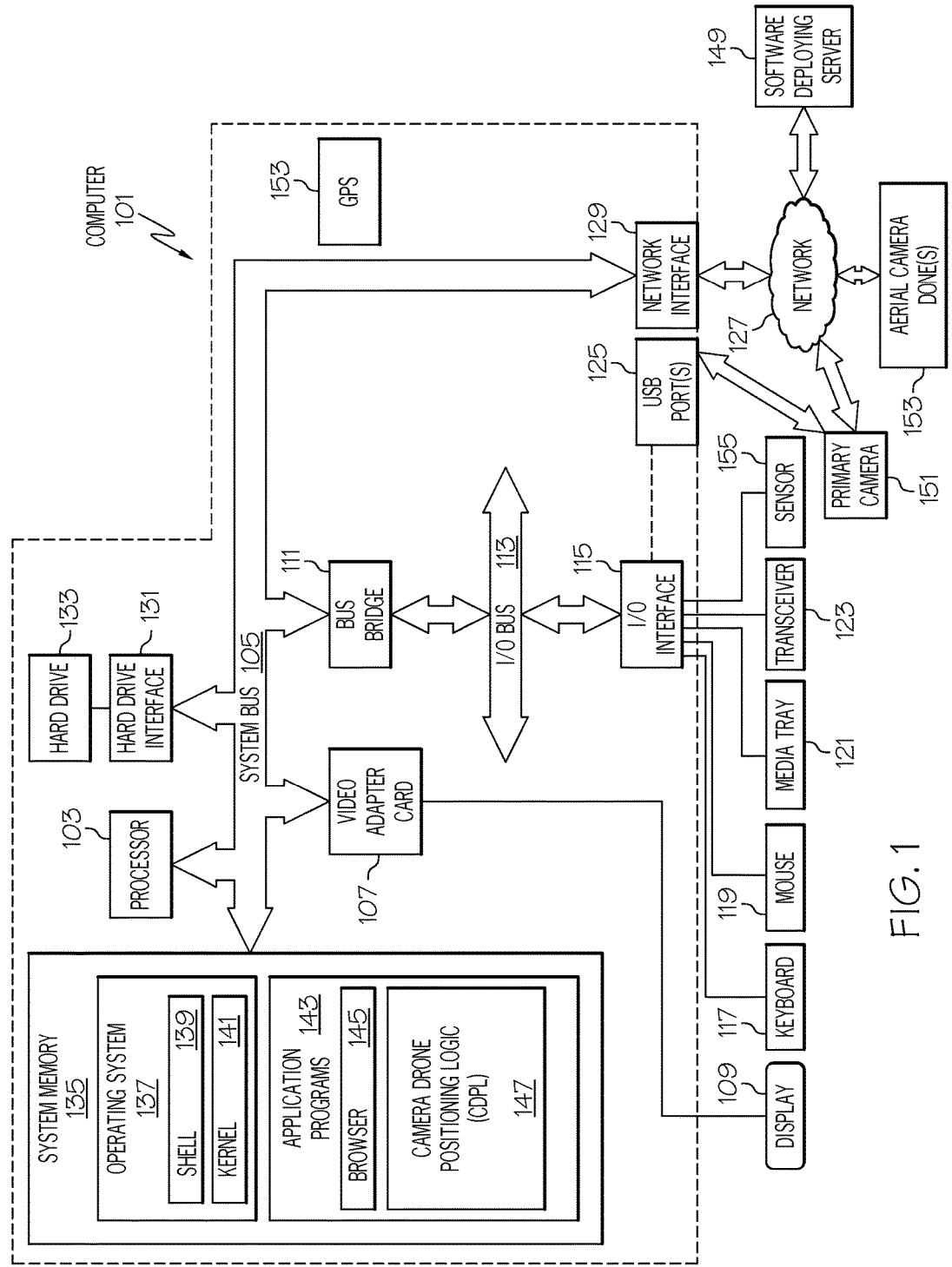
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 101 may be utilized by software deploying server 149, primary camera 151, and/or aerial camera drone(s) 153 shown in FIG. 1; primary camera 251 and/or camera drone 253 shown in FIGS. 2A-2B and FIG. 3; and controller 201 shown in FIGS. 2A-2B.

Exemplary computer 101 includes a processor 103 that is coupled to a system bus 105. Processor 103 may utilize one or more processors, each of which has one or more processor cores. A video adapter card 107, which drives/supports a display 109, is also coupled to system bus 105. In one or more embodiments of the present invention, video adapter card 107 is a hardware video card. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149, primary camera 151, and/or aerial camera drone(s) 153 using a network interface 129. Network interface 129 is a hardware network interface, such as a network interface card (NIC), etc. Network 127 may be an external network such as the Internet, or an internal network such as an Ethernet or a virtual private network (VPN). Furthermore, network 127 may be a wireless network, such as a Near Field Communication (NFC) network, a Wi-Fi network, a Radio Frequency (RF) network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other computer systems.

Application programs 143 in computer 101's system memory (as well as software deploying server 149's system memory) also include a camera drone positioning logic (CDPL) 147. CDPL 147 includes code for implementing the processes described below, including those described in FIGS. 2-4. In one embodiment, computer 101 is able to download CDPL 147 from software deploying server 149, including in an on-demand basis, wherein the code in CDPL 147 is not downloaded until needed for execution. Note further that, in one embodiment of the present invention, software deploying server 149 performs all of the functions associated with the present invention (including execution of CDPL 147), thus freeing computer 101 from having to use its own internal computing resources to execute CDPL 147.

In one or more embodiments of the present invention, computer 101 includes a geographic locator, such as a global positioning system (GPS) device 153 that utilizes signals from GPS satellites to determine the current geophysical/geographic position of the computer 101.

In one or more embodiments of the present invention, computer 101 includes a transceiver 123, which is able to transmit and receive electronic signals, including widely dispersed (non-directional) signals such as Radio Frequency (RF) signals, as well as line-of-sight (directional) signals such as Infrared (IR) signals, etc.

In one or more embodiments of the present invention, computer 101 includes a sensor 155, which is able to only receive electronic signals, including widely dispersed (non-directional) signals and/or line-of-sight signals (directional).

Note that the hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2B:
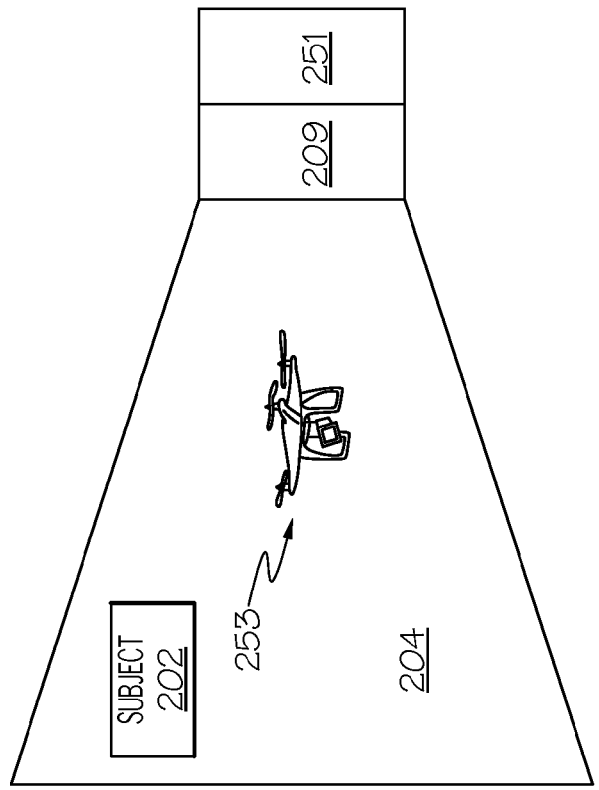
FIGS. 2A-2B illustrate an aerial camera drone that is unwanted within a field of view of a primary camera.
Figure 2A:
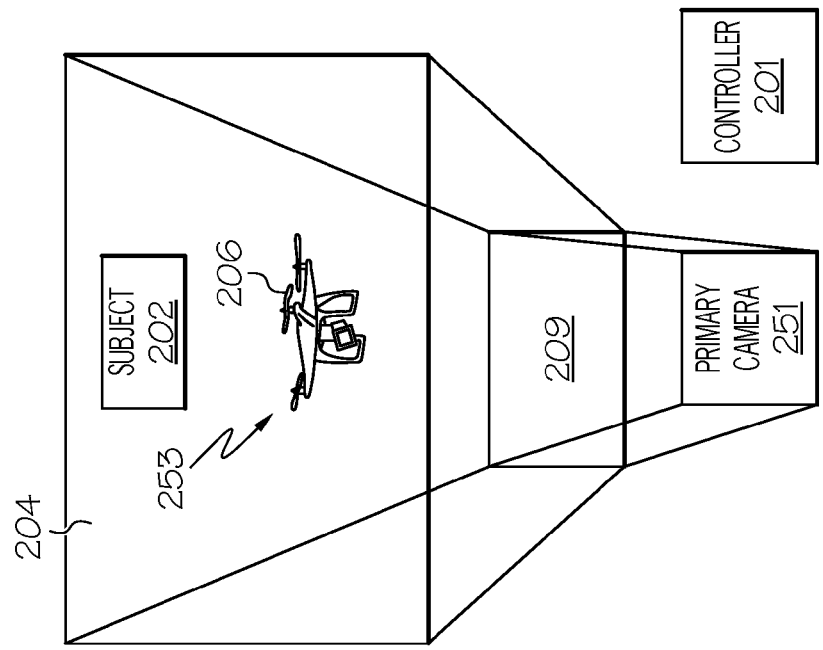

With reference now to FIGS. 2A-2B, an aerial camera drone 253 (analogous to one of the aerial camera drone(s) 153 shown in FIG. 1) that is unwanted within a field of view of a primary camera 251 (analogous to primary camera 151 shown in FIG. 1). (FIG. 2A presents a 3-D perspective view, while FIG. 2B presents a side view of FIG. 2A.) In one or more embodiments of the present invention, primary camera 151/251 is a terrestrial camera, which is mounted in a fixed position (e.g., on a tripod) or in a movable position (e.g., is affixed to a crane, rolling on a track, etc.). In other embodiments of the present invention, primary camera 151/251 is one of the aerial camera drone(s) 153 shown in FIG. 1.

Assume that primary camera 251 captures a field of view 209. That is, the field of view 209 represents what is seen on a display (e.g., display 109 in FIG. 1) on the primary camera 251 (assuming that the primary camera 251 is a digital camera with an electronic viewing screen), or through an optical viewfinder on the primary camera 251. That is, whatever appears in the field of view 209 is what will be captured on film (if the primary camera 251 uses film) or on internal circuitry (if the primary camera 251 is a digital camera that uses a digital image sensor such as a Charge-Coupled Device (CCD) or a Complementary Metal-Oxide-Semiconductor (CMOS) array).

As shown in FIGS. 2A-2B, the primary camera 251 is attempting to capture an image of a subject 202, such as mountain, a building, a distant person, etc., which is within a three-dimensional (3D) physical space 204. That is, the subject 202 occupies a position within the 3D physical space 204. However, within the field of view 209 is an aerial camera drone 253, which even if not blocking the primary camera 251 from fully seeing the subject 202, is still a distraction. Thus, the primary camera 251, the aerial camera drone 253, and/or the controller 201 (which is in electronic communication with the primary camera 251 and/or the aerial camera drone 253) will direct the aerial camera drone 253 to exit the 3D physical space 204. In order to determine what space is occupied by 3D physical space 204, various sensors and settings are utilized.

For example, consider now the 3D space 304 (analogous to the 3D space 204 shown in FIGS. 2A-2B), which due to limitations of depicting a 3D space on a 2D drawing depicts only two of the dimensions of the 3D space 304. Nonetheless, it is understood that 3D space 304 is actually in three-dimensions.

Figure 3:
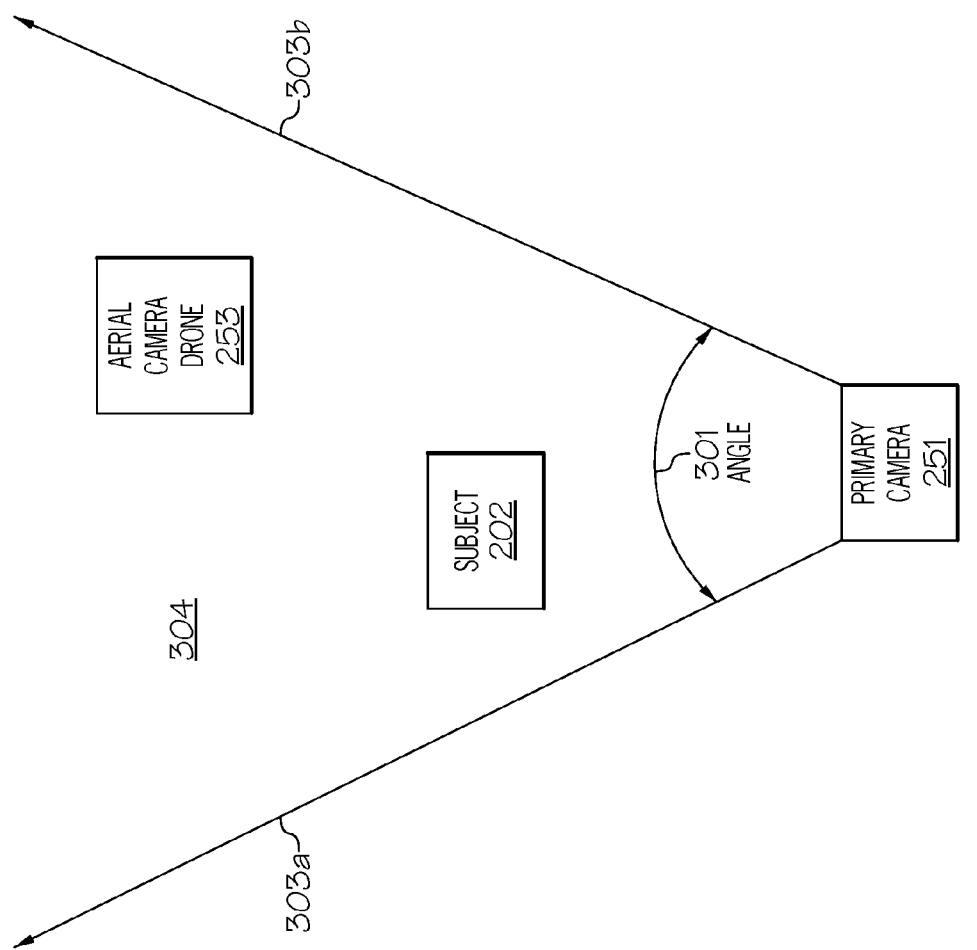
FIG. 3 depicts an embodiment of the present invention in which an aerial camera drone is too far from the primary camera to matter to the shot.

As shown in FIG. 3, 3D space 304 extends away from the primary camera 251 within angle 301 and the vectors 303a-303b. That is, angle 301 and vectors 303a-303b define the 3D space 304 that is seen in the field of view of the primary camera 251.

In the example shown in FIG. 3, the primary camera 251 is still focused on subject 202. However, notice that the aerial camera drone 253 is now farther away from the primary camera 251 than the subject 202. If the aerial camera drone 253 is so far away from the primary camera 251 that it is indistinguishable, if not invisible, then it can be ignored, even though it is still within the field of view of the primary camera 251.

Thus, as described herein, one or more embodiments of the present invention present a new and novel camera, such as primary camera 151/251 described herein. In one or more embodiments of the present invention, the primary camera has a sensor (e.g., sensor 155 shown in FIG. 1) for detecting a mobile airborne device (e.g., aerial camera drone(s) 153 shown in FIG. 1) within a field of view (e.g., field of view 209 shown in FIGS. 2A-2B) of the primary camera. As described herein, a three-dimensional physical space (e.g., 3D physical space 204 shown in FIGS. 2A-2B) is within the field of view of the primary camera.

The sensor 155 may be a video sensor and/or an electronic sensor and/or a position sensor.

For example, in one embodiment of the present invention, the sensor 155 is a camera (which may or may not be part of the main camera itself) that captures a video image of the aerial camera drone. Using image recognition software known to those skilled in the art of video processing, the camera (or the controller 201 shown in FIGS. 2A-2B) is able to identify the aerial camera drone, either by type (i.e., simply determine that there is an aerial camera drone in the field of view of the primary camera) or specifically (i.e., identify which aerial camera drone is in the field of view of the primary camera).

In one embodiment, the camera is trained to look for a simple shape and/or color that are affixed to the aerial camera drone. That is, assume that a particular aerial camera drone has a large red disk affixed to its exterior. This type of object is easy for the system to recognize, thus allowing the system (the primary camera 251, the controller 201, and/or other aerial camera drone(s) 153) to recognize the presence of the aerial camera drone (and/or which aerial camera drone is being observed).

The camera also has a signal generator (e.g., processor 103 in FIG. 1). The signal generator generates a signal that, when received by the mobile airborne device, causes the mobile airborne device to exit the three-dimensional physical space.

The camera also has a transmitter (e.g., transceiver 123 shown in FIG. 1), which transmits the signal to the mobile airborne device to cause the mobile airborne device to exit the three-dimensional physical space that is within the field of view of the primary camera.

In one embodiment of the present invention, the signal being transmitted to the aerial camera drone is a packet of instructions directing the mobile airborne device to exit the three-dimensional physical space that is within the field of view of the primary camera. For example, the signal may be a packet of instructions that direct a navigation system within the aerial camera drone to reposition itself to a particular position (as determined by on-board GPS sensors, accelerometers, etc. within the aerial camera drone).

In one embodiment of the present invention, the signal is a data-less signal, such that the mobile airborne device exits the three-dimensional physical space in response to detecting the data-less signal. For example, assume that the primary camera 251 shown in FIGS. 2A-2B has a transceiver 123 that is able to transmit line-of-sight signals (e.g., focused IR beams) away from the primary camera only into the 3D physical space that is constrained by the angle 301 and vectors 303a-303b shown in FIG. 3. Thus, if an aerial camera drone is within this 3D physical space, an on-board sensor (e.g., sensor 156) will detect the IR beam, thus alerting the aerial camera drone that it is within a "no-fly" zone, and needs to relocate itself. Once the aerial camera drone leaves this no-fly zone, it no longer detects the IR beam, and can remain in a stationary hover or fly into other areas outside of the no-fly zone.

In one embodiment of the present invention, the signal being sent from the primary camera and/or controller to the aerial camera drone is a position range signal, which includes data that identifies the three-dimensional physical space as a restricted area within which the aerial camera drone is prohibited from flying. For example, the signal may include a range of coordinates along all three axes in a 3D system (i.e., a 3-tuple that includes longitude, latitude, and altitude values that identify restricted areas). The aerial camera drone determines its current location (3-tuple) and compares it with the array of restricted 3-tuples. If there is a match, the aerial camera drone autonomously moves itself to a location that is not found in the 3-tuples sent from the primary camera 251 or the controller 201.

In one embodiment of the present invention, the primary camera includes an image recognition device, which identifies a predefined physical feature of the mobile airborne device (such as the red disk described above). The transmitter on the primary camera then transmits the signal to the mobile airborne device to cause the mobile airborne device to exit the three-dimensional physical space in response to the image recognition device identifying the predefined physical feature of the mobile airborne device. That is, if the primary camera (and/or the controller 201) "sees" the red disk, then it will send the "in-shot" signal to the aerial camera drone, directing it to reposition itself out of the field of view of the primary camera.

From the perspective of the aerial camera drone (e.g., a mobile airborne device), the mobile airborne device includes a propulsion device (e.g., motors and propellers, shown as nacelle 206 in FIGS. 2A-2B) that allows the mobile airborne device to fly. A navigation device (e.g., part of GPS 153 and processor 103 shown in FIG. 1) identifies and controls a current physical location of the mobile airborne device within a three-dimensional physical space. That is, the navigation device 1) knows where the aerial camera drone is positioned in real time, and 2) can direct the propulsion device/system to move the aerial camera drone. Thus, when a signal receiver (e.g., transceiver 123 in FIG. 1) receives a signal (which was generated by the primary camera in response to the primary camera detecting the mobile airborne device within the three-dimensional physical space that is within a field of view of the primary camera) from a primary camera, then the signal causes the navigation device to direct the propulsion device to fly the mobile airborne device out of the three-dimensional physical space that is within the field of view of the primary camera.

As described here, in one or more embodiments of the present invention, the mobile airborne device just described is a flying camera drone (also referred to herein as an aerial camera drone) that has an on-board camera.

As described herein, in one or more embodiments of the present invention the signal receiver in the aerial camera drone is a data packet receiver, such that the signal from the primary camera is a packet of instructions directing the navigation device to direct the propulsion device to fly the mobile airborne device out of the three-dimensional physical space that is within the field of view of the primary camera.

As described herein, in one or more embodiments of the present invention the sensor 155 on the aerial camera drone is a data-less signal detector (e.g., an IR detector that merely detects the presence of an IR signal, without extracting any data from the IR signal). Thus, the signal from the primary camera is a data-less signal (i.e., just electromagnetic energy without any embedded data), and the mobile airborne device exits the three-dimensional physical space in response to the data-less signal detector detecting the data-less signal by directing the navigation device to direct the propulsion device to fly the mobile airborne device out of the three-dimensional physical space that is within the field of view of the primary camera.

As described herein, in one or more embodiments the signal received by the aerial camera drone 253 from the primary camera 251 and/or the controller 201 is a position range signal, which includes data that identifies the three-dimensional physical space as a restricted area within which the mobile airborne device is prohibited from flying. Thus, the mobile airborne device exits the three-dimensional physical space in response to the navigation device determining that the mobile airborne device is within the restricted area according to the position range signal.

Figure 4:
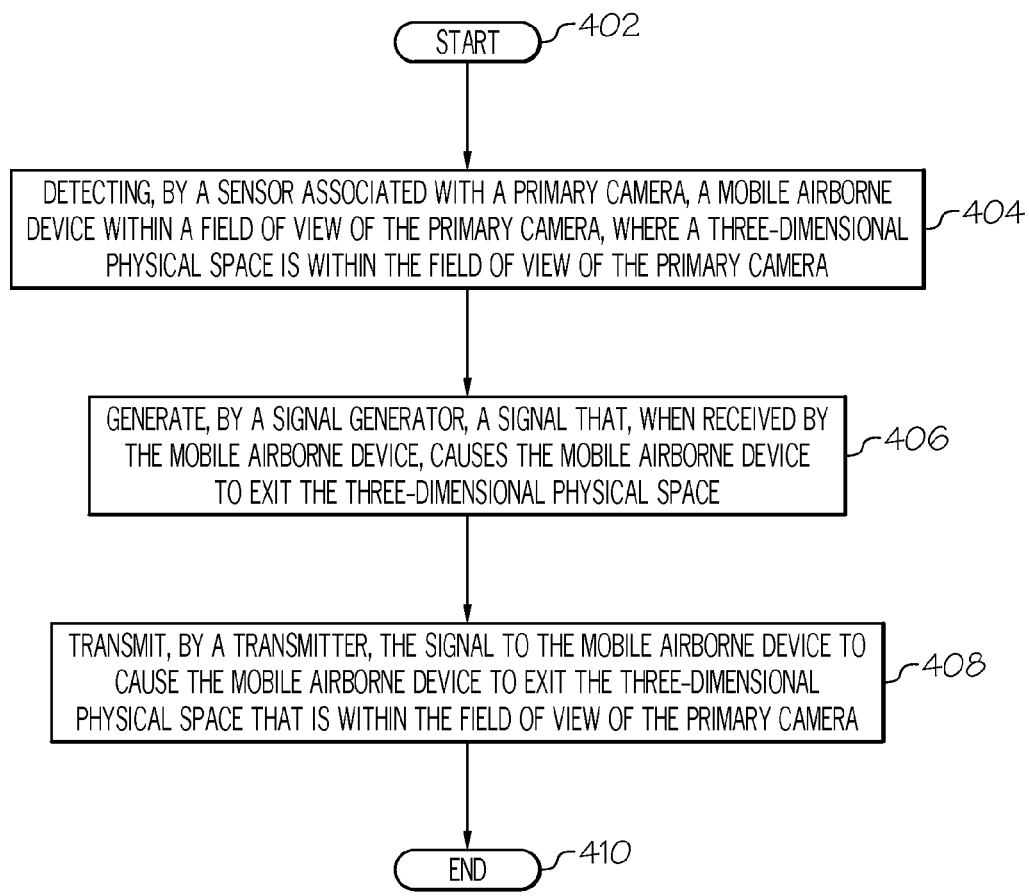
FIG. 4 is a high-level flow chart of one or more steps performed by one or more devices to remove one or more aerial camera drones from a field of view of a primary camera.

With reference now to FIG. 4, a high-level flow chart of one or more steps performed by one or more devices to remove one or more aerial camera drones from a field of view of a primary camera is presented.

After initiator block 402, a sensor associated with a primary camera detects a mobile airborne device within a field of view of the primary camera, where a three-dimensional physical space is within the field of view of the primary camera, as described in block 404. That is, the controller 201 and/or the primary camera 251 shown in FIGS. 2A-2B detect the presence of the aerial camera drone 253 (an exemplary mobile airborne device) within the field of view of the primary camera.

In one or more embodiments of the present invention, one or more sensors (e.g., one or more instances of the sensor 155 depicted in FIG. 1) on the primary camera determine the field of view of the primary camera by determining the direction that the primary camera is pointing. Such sensors may be in the form of strain gauges, accelerometers, 3-D axis gyroscopes, etc. Based on the readings from these sensors, a determination can be made regarding what direction the primary camera is pointing, and thus a determination is made regarding the field of view of the primary camera.

In one or more embodiments, not only is the direction of the primary camera determined, but also the compression or expansion of the field of view. For example, assume that the primary camera has a zoom lens. Sensors determine the amount of movement of the zoom lens (e.g., where the lens is moved forwards or backwards, thus altering the field of view). Based on this movement, processors determine the range of the field of view, in order to define the scope and size and location of the 3D physical space in which the aerial camera drones are to be excluded, as described herein.

As described in block 406, a signal generator (e.g., processor 103 in FIG. 1) in the primary camera 251 and/or the controller 201 generates a signal that, when received by the mobile airborne device, causes the mobile airborne device to exit the three-dimensional physical space, as discussed above.

As described in block 408, a transmitter (e.g., transceiver 123 in FIG. 1) in the primary camera 251 and/or controller 201 then transmits the generated signal to the mobile airborne device, thus causing the mobile airborne device to exit the three-dimensional physical space that is within the field of view of the primary camera.

The flow-chart ends at terminator block 410.

In one or more embodiments of the present invention and as described herein, the signal from the primary camera 251 and/or controller 201 to the aerial camera drone 153 is a packet of instructions directing the mobile airborne device to exit the three-dimensional physical space that is within the field of view of the primary camera.

In one or more embodiments of the present invention and as described herein, the signal from the primary camera 251 and/or controller 201 to the aerial camera drone 153 is a data-less signal, such that the mobile airborne device exits the three-dimensional physical space in response to detecting the data-less signal.

In one or more embodiments of the present invention and as described herein, the signal from the primary camera 251 and/or controller 201 to the aerial camera drone 153 is a position range signal, which includes data that identifies the three-dimensional physical space as a restricted area within which the mobile airborne device is prohibited from flying.

In one or more embodiments of the present invention and as described herein, an image recognition device (e.g., processor 103) associated with the primary camera 251 and/or controller 201 identifies predefined physical features of the mobile airborne device (e.g., the red disk discussed above). Thus, the transmitter in the primary camera 251 and/or controller 201 transmits the signal to the mobile airborne device to cause the mobile airborne device to exit the three-dimensional physical space in response to the image recognition device identifying the predefined physical feature of the mobile airborne device.

In one or more embodiments of the present invention, a location device (e.g., GPS 153 shown in FIG. 3) within the mobile airborne device (e.g., aerial camera drone 253) determines that that the mobile airborne device is at a distance from the primary camera such that an appearance of the mobile airborne device within the field of view of the primary camera has been predetermined to be smaller than a predetermined size. One or more processors within the primary camera 251 and/or controller 201 then determine, based on the mobile airborne device's current position, that the appearance of the mobile airborne device within the field of view of the primary camera is smaller than the predetermined size. Based on this determination (i.e., in response to determining that the appearance of the mobile airborne device within the field of view of the primary camera is smaller than the predetermined size), then the signal to the mobile airborne device is overridden, such that the mobile airborne device is no longer directed to exit the three-dimensional physical space.

In one or more embodiments of the present invention, the primary camera 251 and/or controller 201 detect, based on signals from an orientation sensor within the primary camera, that the field of view of the primary camera has changed to a new field of view due to movement of the primary camera, such that a new three-dimensional physical space is within the new field of view. In response to detecting that the field of view of the primary camera has changed, a signal generator (within the primary camera 251 and/or controller 201) generates a new signal that, when received by the mobile airborne device, causes the mobile airborne device to exit the new three-dimensional physical space. The transmitter (within the primary camera 251 and/or controller 201) then transmits the new signal to the mobile airborne device to cause the mobile airborne device to exit the new three-dimensional physical space that is within the new field of view of the primary camera. Thus, the aerial camera drone acts as a slave to the primary camera. Whenever the primary camera changes its field of view, new signals are sent to the aerial camera drone(s) letting them know if they are in the new 3D physical space within the new field of view.

In one or more embodiments of the present invention, a transmitter in the primary camera 251 and/or controller 201 repeatedly transmits the signal instruction the drone(s) to leave the 3D physical space/area that is within the primary camera's field of view, until all aerial camera drones have left the 3D physical area. Once there are no more mobile airborne devices (aerial camera drones) in the 3D physical area then the signal instructions are no longer transmitted (until the system determines that new airborne devices have entered the 3D physical space described herein).

Note that in one embodiment, the drones (mobile airborne devices, aerial camera drones, etc.) are autonomous, such that their movement is controlled, either directly or indirectly, by signals from the primary camera 251 and/or controller 201. However, even if a person is flying the drones, the present system can still override that person's flight inputs, such that the person is unable to fly into the restricted airspace, by transmitting the control signals described herein to the drones.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
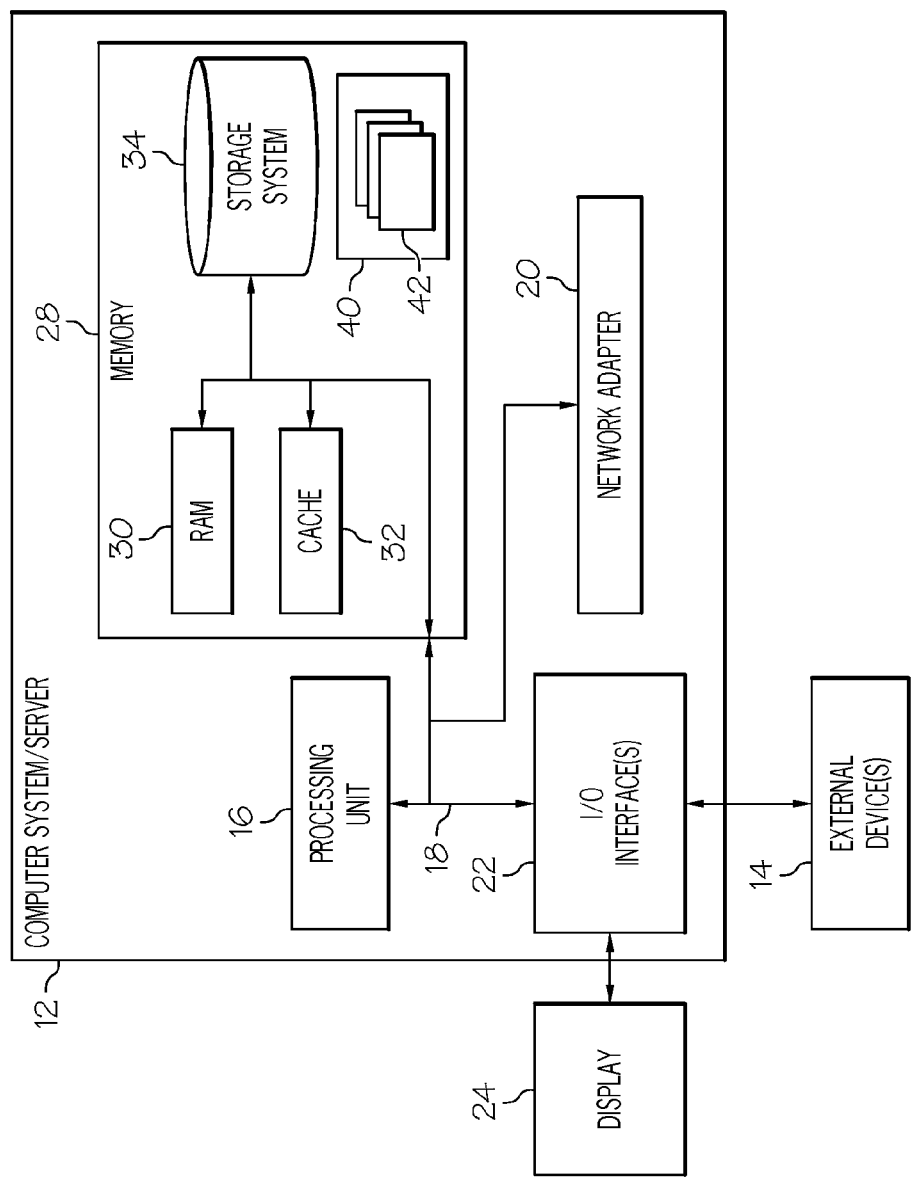
FIG. 5 depicts a cloud computing node according to an embodiment of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
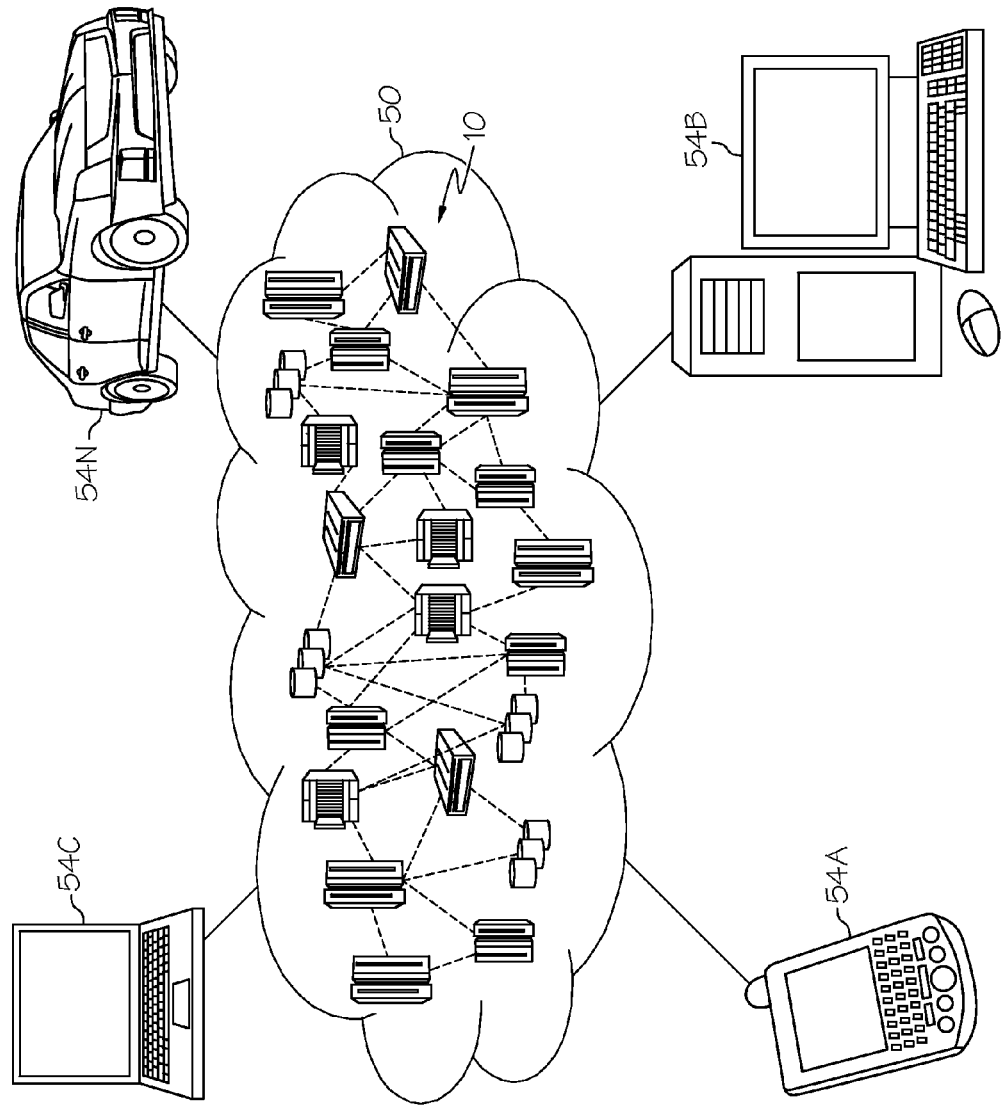
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
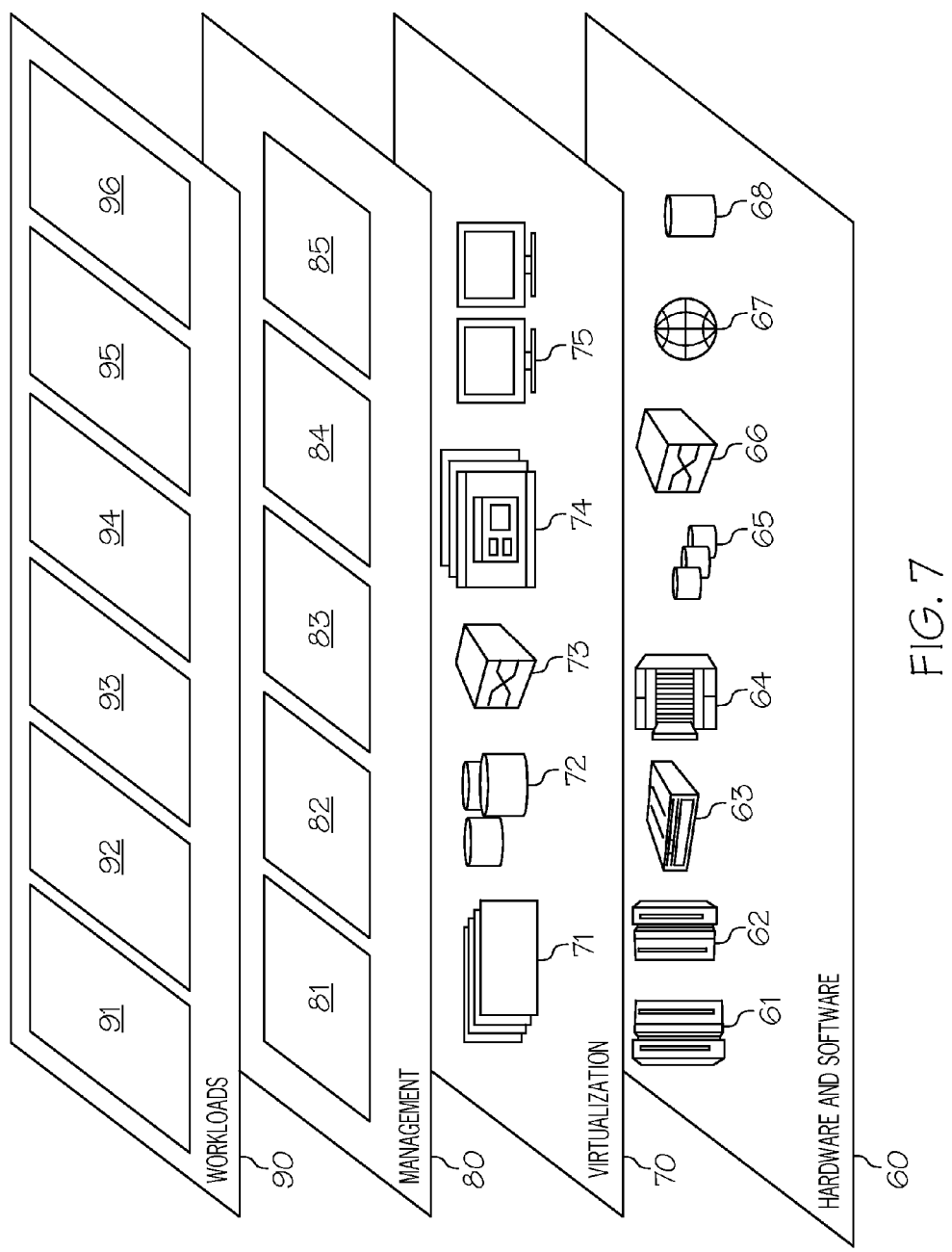
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and camera drone positioning processing 96 (for controlling the position of flying camera drones as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A camera comprising:
   a sensor for detecting a mobile airborne device within a field of view of the camera, wherein the camera is a primary camera, wherein a three-dimensional physical space is within the field of view of the primary camera;
   a signal generator, wherein the signal generator generates a signal that, when received by the mobile airborne device, causes the mobile airborne device to exit the three-dimensional physical space;
   a transmitter, wherein the transmitter transmits the signal to the mobile airborne device to cause the mobile airborne device to exit the three-dimensional physical space that is within the field of view of the primary camera;
   a location device, wherein the location device detects that the mobile airborne device is at a distance from the primary camera such that an appearance of the mobile airborne device within the field of view of the primary camera has been predetermined to be smaller than a predetermined size; and one or more processors, wherein the one or more processors determine that the appearance of the mobile airborne device within the field of view of the primary camera is smaller than the predetermined size, and in response to determining that the appearance of the mobile airborne device within the field of view of the primary camera is smaller than the predetermined size, override the signal to the mobile airborne device such that the mobile airborne device is no longer directed to exit the three-dimensional physical space.

2. The camera of claim 1, wherein the signal is a packet of instructions directing the mobile airborne device to exit the three-dimensional physical space that is within the field of view of the primary camera.

3. The camera of claim 1, wherein the signal is a data-less signal, wherein the mobile airborne device exits the three-dimensional physical space in response to detecting the data-less signal.

4. The camera of claim 1, wherein the signal is a position range signal, wherein the position range signal includes data that identifies the three-dimensional physical space as a restricted area within which the mobile airborne signal is prohibited from flying.

5. The camera of claim 1, further comprising:
an image recognition device, wherein the image recognition device identifies a predefined physical feature of the mobile airborne device, and wherein the transmitter transmits the signal to the mobile airborne device to cause the mobile airborne device to exit the three-dimensional physical space in response to the image recognition device identifying the predefined physical feature of the mobile airborne device.

6. A mobile airborne device comprising:
a propulsion device that flies the mobile airborne device;
a navigation device that identifies and controls a current physical location of the mobile airborne device within a three-dimensional physical space;
a signal receiver, wherein the signal receiver receives a signal from a primary camera, wherein the signal from the primary camera is generated by the primary camera in response to the primary camera detecting the mobile airborne device within the three-dimensional physical space that is within a field of view of the primary camera, and wherein the signal causes the navigation device to direct the propulsion device to fly the mobile airborne device out of the three-dimensional physical space that is within the field of view of the primary camera;
a location device, wherein the location device detects that the mobile airborne device is at a distance from the primary camera such that an appearance of the mobile airborne device within the field of view of the primary camera has been predetermined to be smaller than a predetermined size; and
one or more processors, wherein the one or more processors determine that the appearance of the mobile airborne device within the field of view of the primary camera is smaller than the predetermined size, and in response to determining that the appearance of the mobile airborne device within the field of view of the primary camera is smaller than the predetermined size, override the signal to the mobile airborne device such that the mobile airborne device is no longer directed to exit the three-dimensional physical space.

7. The mobile airborne device of claim 6, wherein the mobile airborne device is a flying camera drone, and wherein the mobile airborne device further comprises:
an on-board camera.

8. The mobile airborne device of claim 6, wherein the signal receiver is a data packet receiver, and wherein the signal from the primary camera is a packet of instructions directing the navigation device to direct the propulsion device to fly the mobile airborne device out of the three-dimensional physical space that is within the field of view of the primary camera.

9. The mobile airborne device of claim 6, further comprising:
a data-less signal detector, wherein the signal from the primary camera is a data-less signal, and wherein the mobile airborne device exits the three-dimensional physical space in response to the data-less signal detector detecting the data-less signal by directing the navigation device to direct the propulsion device to fly the mobile airborne device out of the three-dimensional physical space that is within the field of view of the primary camera.

10. The mobile airborne device of claim 6, wherein the signal is a position range signal, wherein the position range signal includes data that identifies the three-dimensional physical space as a restricted area within which the mobile airborne device is prohibited from flying, and wherein the mobile airborne device exits the three-dimensional physical space in response to the navigation device determining that the mobile airborne device is within the restricted area according to the position range signal.

11. The mobile airborne device of claim 6, further comprising:
a predefined-shaped object affixed to an exterior of the mobile airborne device, wherein the predefined-shaped object is recognizable by the primary camera to identify the mobile airborne device.

12. A method of removing a mobile airborne device from a field of view of a primary camera, the method comprising:
detecting, by a sensor associated with a primary camera, a mobile airborne device within a field of view of the primary camera, wherein a three-dimensional physical space is within the field of view of the primary camera;
generating, by a signal generator, a signal that, when received by the mobile airborne device, causes the mobile airborne device to exit the three-dimensional physical space;
transmitting, by a transmitter, the signal to the mobile airborne device to cause the mobile airborne device to exit the three-dimensional physical space that is within the field of view of the primary camera;
detecting, by a location device, that the mobile airborne device is at a distance from the primary camera such that an appearance of the mobile airborne device within the field of view of the primary camera has been predetermined to be smaller than a predetermined size;
determining, by one or more processors, that the appearance of the mobile airborne device within the field of view of the primary camera is smaller than the predetermined size; and
in response to determining that the appearance of the mobile airborne device within the field of view of the primary camera is smaller than the predetermined size, overriding the signal to the mobile airborne device such that the mobile airborne device is no longer directed to exit the three-dimensional physical space.

13. The method of claim 12, wherein the signal is a packet of instructions directing the mobile airborne device to exit the three-dimensional physical space that is within the field of view of the primary camera.

14. The method of claim 12, wherein the signal is a data-less signal, wherein the mobile airborne device exits the three-dimensional physical space in response to detecting the data-less signal.

15. The method of claim 12, wherein the signal is a position range signal, wherein the position range signal includes data that identifies the three-dimensional physical space as a restricted area within which the mobile airborne signal is prohibited from flying.

16. The method of claim 12, further comprising:

identifying, by an image recognition device, a predefined physical feature of the mobile airborne device, and wherein the transmitter transmits the signal to the mobile airborne device to cause the mobile airborne device to exit the three-dimensional physical space in response to the image recognition device identifying the predefined physical feature of the mobile airborne device.

17. The method of claim 12, further comprising:

detecting, by one or more processors and based on signals from an orientation sensor within the primary camera, that the field of view of the primary camera has changed to a new field of view due to movement of the primary camera, wherein a new three-dimensional physical space is within the new field of view;

in response to detecting that the field of view of the primary camera has changed, generating, by the signal generator, a new signal that, when received by the mobile airborne device, causes the mobile airborne device to exit the new three-dimensional physical space; and transmitting, by the transmitter, the new signal to the mobile airborne device to cause the mobile airborne device to exit the new three-dimensional physical space that is within the new field of view of the primary camera.

18. The method of claim 12, further comprising:

repeatedly transmitting, by the transmitter, the signal to a plurality of mobile airborne devices until none of the plurality of mobile airborne devices is within the field of view of the primary camera.

19. The method of claim 12, wherein a specifically colored and shaped marking is affixed to the mobile airborne device, and wherein the method further comprises:

detecting, by the primary camera, the specifically colored and shaped marking that is affixed to the mobile airborne device;

in response to detecting the specifically colored and shaped marking that is affixed to the mobile airborne device, transmitting the signal to the mobile airborne device that causes the mobile airborne device to exit the three-dimensional physical that is within the field of view of the primary camera to the mobile airborne device that has the specifically colored and shaped marking.

\* \* \* \* \*